United States Patent
Kato et al.

(10) Patent No.: US 7,224,442 B2
(45) Date of Patent: May 29, 2007

(54) SUPPLY CONTROL SYSTEM AND METHOD, PROGRAM, AND INFORMATION STORAGE MEDIUM

(75) Inventors: Kazufumi Kato, Sakata (JP); Akira Tadano, Fujimi-machi (JP); Yuki Sugawara, Sakata (JP)

(73) Assignee: Seiko Epson Corporation (JP)

( * ) Notice: Subject to any disclaimer, the term of this patent is extended or adjusted under 35 U.S.C. 154(b) by 43 days.

(21) Appl. No.: 10/978,270

(22) Filed: Oct. 29, 2004

(65) Prior Publication Data

US 2005/0117143 A1 Jun. 2, 2005

(30) Foreign Application Priority Data

Oct. 31, 2003 (JP) .............................. 2003-372138

(51) Int. Cl.
*G03B 27/42* (2006.01)
(52) U.S. Cl. .......................... 355/75; 414/935; 700/97
(58) Field of Classification Search ...................... None
See application file for complete search history.

(56) References Cited

U.S. PATENT DOCUMENTS

| | | | | |
|---|---|---|---|---|
| 5,751,581 | A * | 5/1998 | Tau et al. ...................... | 700/115 |
| 5,886,896 | A * | 3/1999 | Lantz et al. .................. | 700/116 |
| 5,972,727 | A * | 10/1999 | Ryan et al. ..................... | 438/14 |
| 5,980,183 | A * | 11/1999 | Fosnight ................ | 414/222.01 |
| 6,351,684 | B1 * | 2/2002 | Shirley et al. ............... | 700/121 |
| 6,434,440 | B1 * | 8/2002 | Teranishi et al. ............. | 700/97 |
| 6,438,436 | B1 * | 8/2002 | Hohkibara et al. ............ | 700/97 |
| 6,865,433 | B1 * | 3/2005 | Burda ........................ | 700/101 |
| 6,928,334 | B2 * | 8/2005 | Kuo ............................ | 700/115 |
| 2001/0047222 | A1 * | 11/2001 | Wiesler et al. ............... | 700/214 |
| 2002/0120357 | A1 * | 8/2002 | Okabe et al. .................. | 700/99 |
| 2002/0160589 | A1 * | 10/2002 | Omi ............................ | 438/527 |

(Continued)

FOREIGN PATENT DOCUMENTS

EP 0846983 A2 6/1998

(Continued)

OTHER PUBLICATIONS

Yamagishi, "The World's First Automated Reticle Handling System Using OHT", IEEE, pp. 21-24, (2003).

(Continued)

*Primary Examiner*—D. Rutledge
(74) *Attorney, Agent, or Firm*—Harness, Dickey & Pierce, P.L.C.

(57) ABSTRACT

A supply control apparatus is provided and includes a memory for storing lot control data for controlling a plurality of lots, reticule control data for controlling a plurality of masks, and inline photo device control data; an update section for updating the data; a control information generating section generating lot supply control information for controlling lot supply based on the lot control data and the reticule control data, as well as mask supply control information for controlling mask supply; and a communications section for transmitting the lot supply control information to a lot supply device that supplies lots to the photo device, transmitting the mask supply control information to a mask supply device that supplies masks to the photo device, while receiving notification information on the current position of a lot or a mask from the lot supply device, the mask supply device or the photo device.

2 Claims, 6 Drawing Sheets

U.S. PATENT DOCUMENTS

2005/0273190 A1* 12/2005 Duffin et al. ............... 700/112
2006/0052889 A1* 3/2006 Burda et al. .................. 700/96

FOREIGN PATENT DOCUMENTS

| | | |
|---|---|---|
| JP | 61-061415 | 3/1986 |
| JP | 03-293712 | 12/1991 |
| JP | 05-94931 | 4/1993 |
| JP | 10-163094 | 6/1998 |
| JP | 11-307422 | 11/1999 |
| JP | 2001-35783 | 2/2001 |
| JP | 2002-353106 | 12/2002 |

OTHER PUBLICATIONS

Papers related to the International Symposium on Semiconductor Manufacturing (ISSM) Sep. 30, 2003 (17 pages including pp. 515-519 of Appendix).

Examination result issued in corresponding Japanese application. dated Mar. 7, 2007.

* cited by examiner

| LOT ID | CURRENT POSITION | STATUS | PRIORITY | RETICULE IN USE ID | ... |
|---|---|---|---|---|---|
| L001 | INLINE PHOTO DEVICE | DURING PROCESSING | 1 | R001 | ... |
| L002 | LOT SUPPLY DEVICE | PROCESSIBLE | 4 | R002 | ... |
| ⋮ | ⋮ | ⋮ | ⋮ | ⋮ | ⋮ |

FIG. 3

| RETICULE ID | CURRENT POSITION | STATUS | USAGE FREQUENCY | ... |
|---|---|---|---|---|
| R001 | INLINE PHOTO DEVICE | DURING USE | 30 | ... |
| R002 | RETICULE STOCKER | USABLE | 40 | ... |
| R003 | INSPECTION DEVICE | DURING INSPECTION | 50 | ... |
| ⋮ | ⋮ | ⋮ | ⋮ | ⋮ |

FIG. 4

| DEVICE ID | STATUS | LOT IN USE ID | PORT ID | RETICULE IN USE ID | ... |
|---|---|---|---|---|---|
| M001 | DURING USE | L001 | P001 | R001 | ... |
| | | | P002 | R010 | ... |
| | | | P003 | R011 | ... |
| | | | P004 | | ... |
| ... | ... | ... | ... | ... | ... |

FIG. 5

SUPPLY CONTROL SYSTEM AND METHOD, PROGRAM, AND INFORMATION STORAGE MEDIUM

RELATED APPLICATIONS

This application claims priority to Japanese Patent Application No. 2003-372138 filed Oct. 31, 2003 which is hereby expressly incorporated by reference herein in its entirety.

BACKGROUND

1. Field of the Invention

The present invention relates to a supply control system and a method of supplying a lot and a mask to a photo device.

2. Related Art

Generally, a photo device used for semiconductor fabrication and the like is made up of a coater for coating a chemical agent and the like on a wafer and the like, an exposure device to perform predefined patterning on the wafer by using a mask (also referred to as reticle), and a developer to perform development. Also, the photo device has a baking unit to perform baking as necessary.

When producing many kinds of products such as in semiconductor fabrication, exposure is conducted in tune with each process of each lot consisting of the same kind of wafer, so that many kinds of masks are used. Consequently, it is technically difficult to automatically supply masks per lot to the photo device. Therefore, a conventional method was to manually supply masks to the photo device.

To solve such problem, there is described in Japanese Unexamined Patent Publication No. 10-163094 describes conveying a reticle case via an unmanned conveying robot from a reticle stocker to a reticle receiving position of the photo device.

However, in Japanese Unexamined Patent Publication No. 10-163094, there are disclosed only techniques regarding reticle position, while there is no disclosure of techniques to supply proper reticles in accordance with many kinds of lots.

Consequently, according to the manual method or the method of Japanese Unexamined Patent Publication No. 10-163094, for example, when supplying a reticle from the external reticle stocker while the maximum permissible number of reticles are available in a reticle library in the photo device, there is difficulty in determining which reticule to take out or to supply a proper reticle if there is a different combination of a lot and a reticule each time.

The present invention has been made in view of the above-mentioned problem. It is an object thereof to provide a supply control system and a method, a program, and an information storage medium, which can properly control supply of a lot and a mask to the photo device.

SUMMARY

To solve the above-mentioned problem, a supply control system according to the present invention which is a supply control system controlling the supply of a lot and a mask to a photo device, comprises:
a memory for storing lot control data to control a plurality of lots and mask control data to control a plurality of masks;
an update section that updates the lot control data and the mask control data;
a control information generating section that generates lot supply control information to control the supply of a lot and mask supply control information to control the supply of a mask based on the lot control data and the mask control data;
a communications section that transmits the lot supply control information to a lot supply device that supplies a lot to the photo device and transmits the mask supply control information to a mask supply device that supplies a mask to the photo device, while receiving notification information to show a current position of a lot or a mask from the lot supply device, the mask supply device, or the photo device, wherein:
the lot control data includes data showing lot identification information, current lot position data showing the current position of a lot, and mask identification information to be used in a lot;
the mask control data includes data showing the mask identification information and current mask position data showing the current position of a mask, while being made relatable to the lot control data by the mask identification information;
the update section updates the current lot position data and the current mask position data based on the notification information; and
the control information generating section generates the lot supply control information and the mask supply control information based on the current lot position data and the current mask position data.

Further, a program according to the present invention, which controls the supply of a lot and a mask to the photo device, and which may be read by a computer, comprises:
a memory for storing the lot control data to control a plurality of lots and the mask control data to control a plurality of masks;
an update section that updates the lot control data and the mask control data;
a control information generating section that generates the lot supply control information to control the supply of a lot and the mask supply control information to control the supply of a mask, based on the lot control data and the mask control data; and
a communications section that transmits the lot supply control information to the lot supply device that supplies a lot to the photo device and transmits the mask supply control information to the mask supply device that supplies a mask to the photo device, while receiving notification information on a current position of a lot or a mask from the lot supply device, the mask supply device, or the photo device, wherein:
the lot control data includes data showing the lot identification information, current lot position data showing the current position of a lot, and data showing the mask identification information to be used in a lot;
the mask control data includes data showing the mask identification information and the current mask position data showing the current position of a mask, while being made relatable to the lot control data by the mask identification information;
the update section, based on the notification information, updates the current lot position data and the current mask position data; and
the control information generating section, based on the current lot position data and the current mask position data, generates the lot supply control information and the mask supply control information.

Still further, an information storage medium according to the present invention comprises an information storage medium which stores a computer-readable program which stored the above-mentioned program.

Furthermore, the supply control system according to the present invention which controls the supply of a lot and a mask to the photo device, comprises the steps of:

receiving notification information on the current position of a lot or a mask from the lot supply device, the mask supply device, or the photo device;

updating the current position data showing the current position of a lot or the current mask position data showing the current position of a mask based on the notification information;

upon request of exposure processing in the photo device, generating the lot supply control information to control the supply of a lot and the mask control supply information to control the supply of a mask based on the mask control data to control a plurality of masks, wherein:

the data showing the lot identification information, the current lot position data and the data showing mask identification data to be used in a lot are included;

the lot control data to control a plurality of lots and data showing the mask identification information are included, while being made relatable to the lot control data by the mask identification information;

the lot supply control information is transmitted to the lot supply device that supplies a lot to the photo device; and the mask supply control information is transmitted to the mask supply device that supplies a mask to the photo device.

According to the present invention, the supply control system and the like may properly select a mask subject to use in a lot by relating a lot to a mask, thus making it possible to understand the current positions of the lot and the mask based on notification information. This enables the supply control system and the like to control the lot supply device and the mask supply device such that a proper lot and a proper mask may be supplied, and hence, the supply of a lot and a mask to the photo device may be properly controlled.

Furthermore, in the supply control system, the program, and the information storage medium, the mask control data includes mask status data showing mask status and mask usage frequency data showing the frequency of mask usage, wherein:

the update section, based on the notification information, updates the mask usage frequency data, while, at the same time, updates the mask status data so as to update the mask status if the mask usage frequency exceeds a predefined value; and the control information generating section, based on the mask status data, determines in regard to the mask subject to use whether or not the mask subject to use is usable, whereas, should it be usable, the lot and the mask are used, and should it not be usable, the lot supply control information and the mask supply control information may be generated so as to use the lot and another mask or another lot and another mask.

Furthermore, in the supply control system, the mask control data includes the mask status data showing the mask status and the mask usage frequency data showing the frequency of mask usage, wherein:

the data showing the mask usage frequency are updated based on the notification information, and the mask status data are updated so as to update the mask status if the mask usage frequency exceeds a predefined value;

based on the mask status data, it is determined in regard to the lot for use whether or not the mask subject to use is usable, whereas, should it be usable, the lot and the mask are used, and should it not be usable, the lot supply control information and the mask supply control information may be generated so as to use the lot and another mask or another lot and another mask.

According to this, the supply control system and the like may control the mask supply device so that a mask usable at all times may be selected and used. Also, if there is no proper mask suitable for a lot, the supply control system and the like may control the lock supply device and the mask supply device so that another lot and another mask may be selected and used.

Moreover, in the supply control system, the program, and the information storage medium, the lot control data includes priority data showing priority of lot processing, wherein:

the control information generating section, based on the priority data, may generate the lot supply control information so as to process a lot in order of high priority.

Further, in the supply control method, the lot control data includes the priority data showing the priority of lot processing, wherein:

the lot supply control information, based on the priority data, may be generated so as to process a lot in order of high priority.

According to this, the supply control system and the like may control the lot supply device so as to process a lot in order of high priority.

Further, in the supply control system, the program, and the information storage medium, the photo device consists essentially of a mask loading unit capable of loading a plurality of masks, a move control unit for moving a mask inside the photo device, and an exposure side communications unit to generate the notification information for transmission thereof to the communications section, wherein:

the memory stores photo device control data to control the photo device;

the update section, based on the notification information, updates the photo apparatus control data;

the control information generating section, based on the photo device control data, generates mask move control information to control mask movement inside the photo device;

the communications section transmits the mask move control information to the photo device;

the exposure side communications unit receives the mask move control information; and the move control unit, based on the mask move control information, loads a mask on the mask loading unit or moves a mask from the mask loading unit.

Still further, in the supply control method, the photo device includes the mask loading unit capable of loading a plurality of masks, the move control unit for moving a mask inside the photo device, and the exposure side communications unit to generate the notification information for transmission thereof to the communications section, wherein:

the photo device control data to control the photo device are updated, based on the notification information;

mask move control information to control mask movement inside the photo device is generated, based on the photo device control data;

the mask move control information is transmitted to the photo device;

the exposure side communications unit receives the mask move control information; and the move control unit, based on the mask move control information, may load a mask on the mask loading unit or move a mask from the mask loading unit.

According to this, the supply control system and the like may properly control the movement of a mask inside the photo device. If a mask inside the photo device is reusable, this enables the supply control system and the like to let the photo device to use the mask as it is, thus shortening the time required for supplying a mask and making it possible for the photo device to perform effective exposure processing.

Further, in the supply control system, the program, and the information storage medium, the photo device control data includes port ID data showing a port on which a mask is loaded on the mask loading unit, and mask ID data showing a mask set up in the port, wherein:

the control information generating section, if it is determined, based on the port ID data and the mask ID data, that there is one port where no mask is loaded on the mask loading unit, may generate the mask move control information, so that after one mask is moved from the mask loading unit based on a predefined criterion, the mask subject to use may be loaded on the port of the mask loading unit.

Still further, in the supply control method, the photo device control data includes port ID data showing a port on which a mask is loaded on the mask loading unit, and mask ID data showing a mask set up in the port, wherein:

if it is determined, based on the port ID data and the mask ID data, that there is one port where no mask is loaded on the mask loading unit, the control information generating section may generate the mask move control information, so that after one mask is moved from the mask loading unit based on the predefined criterion, the mask subject to use may be loaded on the port of the mask loading unit.

According to this, since the supply control apparatus may permit a mask not for use to be conveyed from the photo device after the mask subject to use is conveyed to the photo device, it is possible for the photo device to perform efficient exposure processing.

BRIEF DESCRIPTION OF THE DRAWINGS

FIG. 3 is a diagram showing a data structure of lot control data according to an example of the present embodiment;

FIG. 4 is a diagram showing a data structure of reticule control data according to an example of the present embodiment;

FIG. 5 is a diagram of a supply control apparatus according to an example of the present embodiment;

DETAILED DESCRIPTION

In the following, the present invention is described with reference to the drawings by taking a case where application is made to a supply control system of a lot and a mask (hereinafter referred to as the "reticule") to an inline photo device (photo device) used in semiconductor fabrication. It should be noted that the embodiment shown below does not restrict the content of the invention described in the claims whatsoever. Further, the configurations shown in the following embodiment are not necessarily essential to the invention described in the claims.

Figure 1:
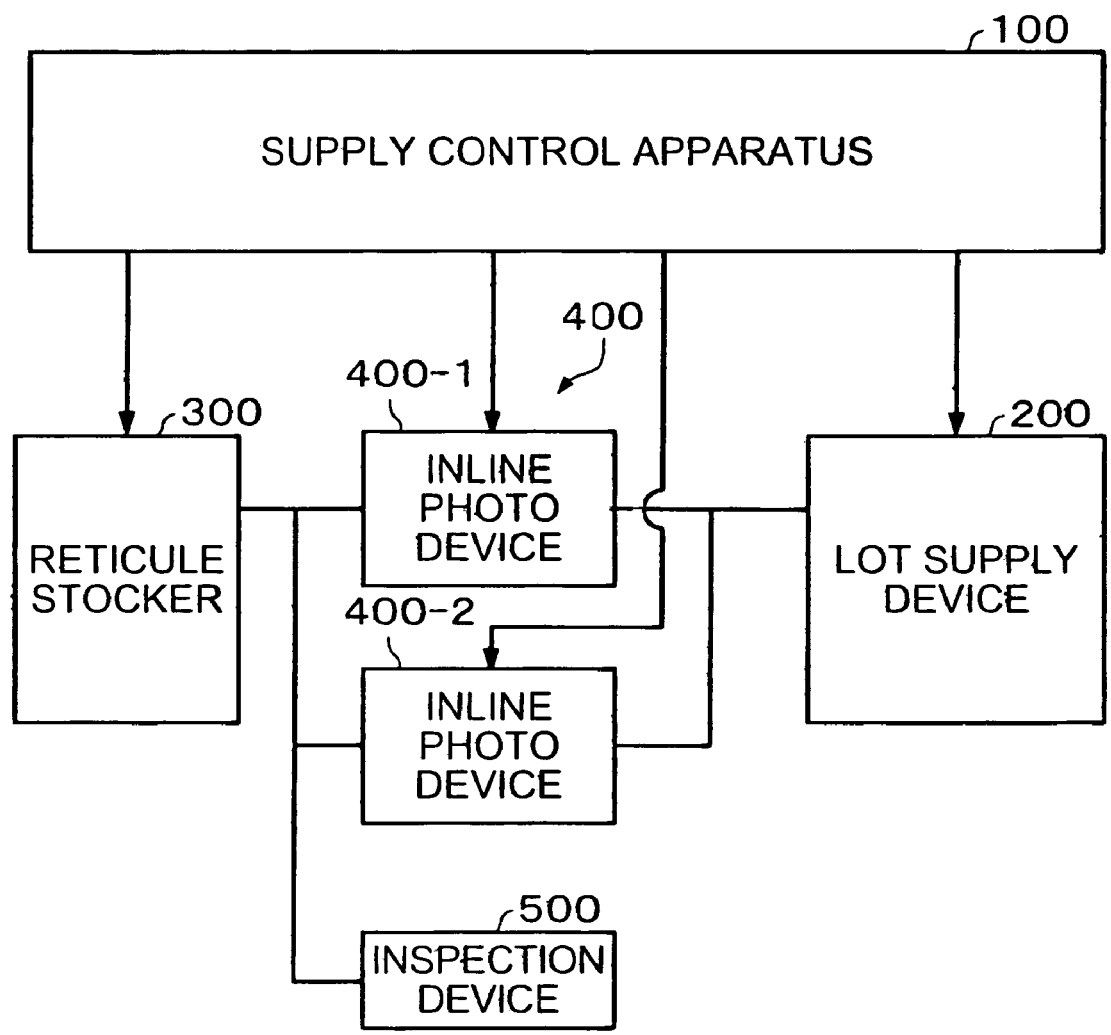
FIG. 1 is a schematic diagram showing an entire system according to an example of the present embodiment.

FIG. 1 is a schematic diagram showing the entire system according to an example of the present embodiment.

In exposure processing, a lot (in a case of semiconductor fabrication, for example, a wafer and the like) is supplied from a lot supply device 200 to an inline photo device, a reticule corresponding to the lot is supplied from a reticule stocker (mask supply device) 300 and exposure processing is performed.

Further, as shown in FIG. 1, there is a case of performing exposure processing by a plurality of units of inline photo device 400-1 and 400-2. It is important to efficiently supply a reticule suitable for a lot to the inline photo device 400.

Still further, when the reticule is used repeatedly, there are cases of dust particles and the like depositing thereon, so that an inspection device 500 examines the reticule according to a frequency of usage thereof.

In the present embodiment, a reticule suitable for a lot is efficiently supplied to the inline photo device 400 as a supply control apparatus 100 controls a lot supply device 200, a reticule stocker 300, and the inline photo device 400.

Next, a functional block of the supply control apparatus 100 for realizing such function will be described.

Figure 2:
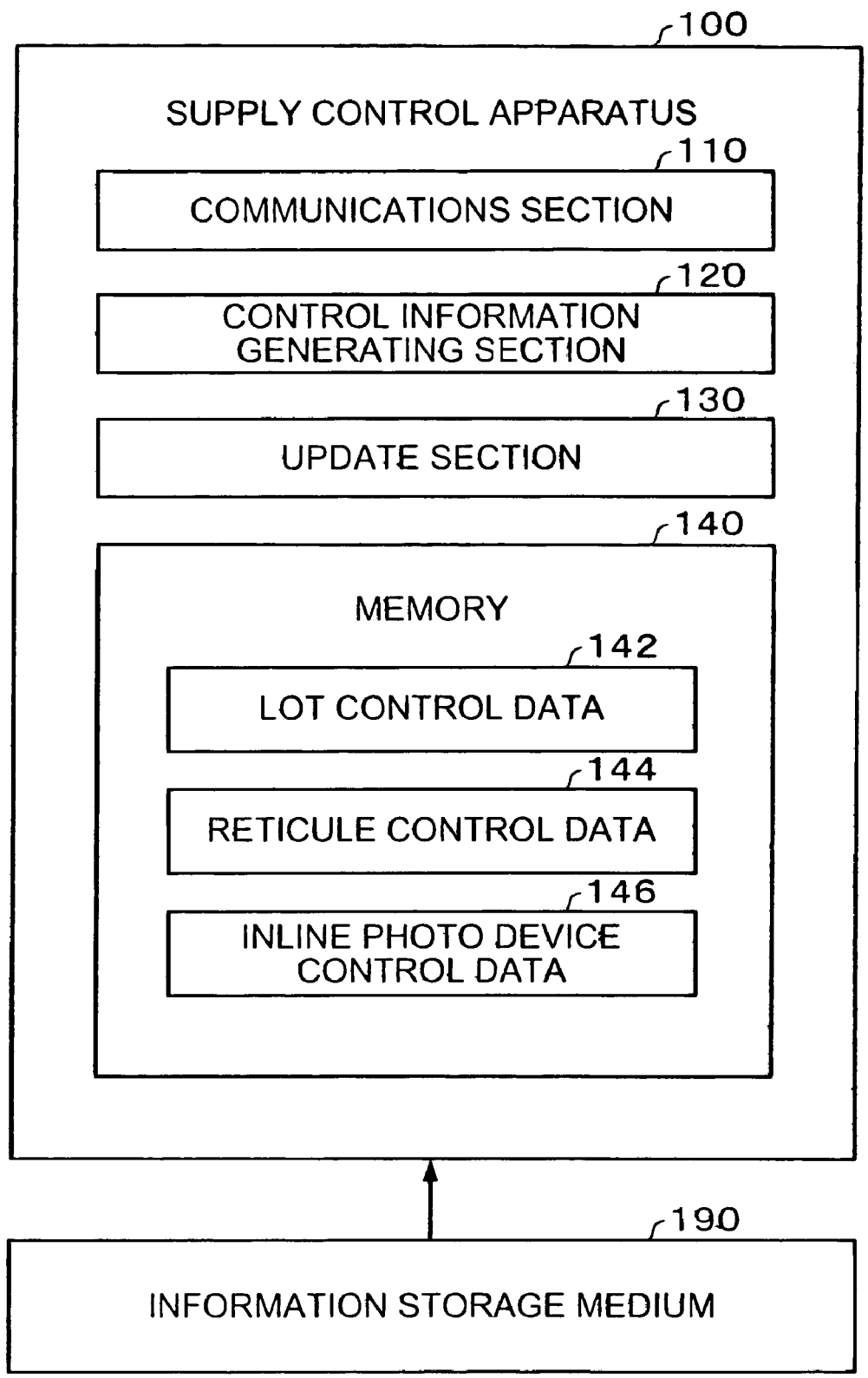
FIG. 2 is a functional block diagram of a supply control apparatus according to an example of the present embodiment.

FIG. 2 is a functional block diagram of the supply control apparatus 100 according to an example of the present embodiment.

The supply control apparatus 100 is constituted by lot control data 142 to control a plurality of lots, reticule control data (mask control data) 144 to control a plurality of reticules, and a memory 140 storing inline photo device control data (photo device control data) 146 to control the inline photo device 400.

Further, the supply control apparatus 100, based on the lot control data 142 and the reticule control data 144, generates lot supply control information to control the supply of a lot and reticule supply control information (mask supply control information) to control the supply of a reticule, while it is configured by including a control information generating section 120 which generates reticule move control information (mask move control information), based on the inline photo device control data 146, to control reticule movement inside the inline photo device 400.

Still further, the supply control apparatus 100 transmits lot supply control information to an update section 130 updating the lot control data 142, the reticule control data 144, and the inline photo device control data 146 and the lot supply apparatus 200 supplying a lot to the inline photo device 400, while it is configured by including a communications section 110 transmitting reticule supply control information to the reticule stocker 300.

It should be noted that the inline photo device 400 is configured by including a delivery section accepting a lot delivery from the lot supply device 200, a port functioning as a mask loading unit capable of loading a plurality of reticules, a delivery section making a delivery of a reticule with the reticule stocker 300, the move control unit moving a reticule between the delivery section and the port, and an exposure device having an exposure processing section which performs exposure processing. Also, the inline photo device 400 may be configured such as to include a coater for coating a chemical agent and the like, a developer for perform development, and a baking unit.

Further, the lot supply device 200, the inline photo device 400, and the reticule stocker 300 are configured by including a communications section (exposure side communications unit and the like) which receives control information such as the reticule move control information from the supply control apparatus 100, while generating notification information to show the current position, status and the like of a lot and a mask and transmit the information to the supply control apparatus 100.

It should be noted that for a timing of transmitting notification information, for example, there may be employed a point in time when a lot or a reticule enters the inline photo device 400, the lot supply device 200, or the reticule stocker 300, a point in time when a lot or a reticule leaves the inline photo device 400, the lot supply device 200, or the reticule stocker 300, and the like.

Next, a data structure of each data in the memory 140 will be described.

FIG. 3 is a diagram showing the data structure of the lot control data 142 according to an example of the present embodiment.

As items of the lot control data 142, there are, for example, the "Lot ID" for lot identification, the "Current Position" (Current lot position data) showing the current position of a lot, the "Status" showing the current status of a lot, the "Priority" showing the priority of lot processing, the "Reticule in Use ID" showing a reticule to be used in a lot, and the like. Also, as the "Status," there are, for example, the "Processible," the "During Processing," the "Not Processible" and the like.

For instance, in an example shown in FIG. 3, it is apparent that a lot whose "Lot ID" is "L001" has its "Current Position" in the "Inline photo device," its "Status" being "During Processing" with "1" for its "Priority" and "R001" for "Reticule in Use ID."

Next, the data structure of the reticule control data 144 will be described.

FIG. 4 is a diagram showing a data structure of the reticule control data 144 according to an example of the present embodiment.

As items of the reticule control data 144, there are, for example, the "Reticule ID" for reticule identification, the "Current Position" (Current mask position data) showing the current position of a reticule, the "Status" (current mask status) showing the current status of a reticule, the "Priority" showing the priority of lot processing, the "Reticule in Use ID" showing a reticule to be used in a lot, and the like. Also, as the "Status," there are, for example, the "Usable," the "During Use", the "Not Usable," the "During Inspection" and the like. Further, the lot control data 142 and the reticule control data 144 are made relatable by the "Reticule ID" which is the mask identification information.

For instance, in an example shown in FIG. 4, it is apparent that a reticule whose "Reticule ID" is "R003" has its "Current Position" in the "Inspection Device," its "Status" being the "During Inspection" and "50" for the "Usage Frequency."

In this manner, the "Usage Frequency" is set up in the reticule control data 144. The update section 130 updates the usage frequency whenever a reticule is used, while updating the "Status" of the reticule to the "During Inspection" or the "Not Usable" when the usage frequency exceeds the predefined value (for example, 50 and the like).

This enables the control information generating section 120 to properly determine a reticule subject to inspection based on the "Status" of the reticule control data 144 or determine a usable reticule. The control information generating section 120 generates the reticule supply control information for supplying a reticule whose "Status" became the "During Inspection" from the reticule stocker 300 to the inspection device 500. As the communications section 110 transmits the reticule supply control information to the reticule stocker 300, the reticule stocker 300 supplies the reticule to the inspection device 500, and the inspection device 500 performs inspection of the reticule.

It should be noted that instead of usage frequency or setting up usage time in addition to the usage frequency, a reticule which has been used more than a predefined period of time may be subjected to inspection.

Next, a data structure of the inline photo device 146 will be described.

FIG. 5 is a diagram showing the data structure of the inline photo device according to an example of the present embodiment.

As items of the inline photo device control data 146, there are, for example, the "Device ID" for inline photo device identification, the "Status" showing the current status of an apparatus, the "Usage Lot ID" showing the lot in use, the "Port ID" for identification of a port which is a reticule loading unit, the "Usage Reticule ID" for identification of a reticule loaded on the port (mask ID data" and the like.

It should be noted that a device having 4 ports are assumed for the inline photo device in the present example. Naturally, the number of ports may be 3 or less, or 5 or more.

For instance, in an example shown in FIG. 5, it is apparent that the inline photo device 400 whose "Device ID" is "M001" has its "Status" "During Use," with its "Usage Lot ID" "L001" and its "Port ID" "P001," and that ports of "P001," "P002," and "P003" are loaded with reticules, indicating that a port with its "Port ID" of "P004" is vacant.

Further, as hardware to be mounted on the computer as each section of the above-mentioned supply control apparatus 100, for example, the following may be applied.

For instance, there may be mounted on the computer a LAN board and the like for the communications section 110, a CPU and the like for the control information generating section 120 and the update section 130, and an HDD and the like for the memory 140.

Further, these sections may be mounted on the computer by using circuits in terms of hardware, or mounted on the computer by using software in terms of software.

Still further, the computer may be packed with a function of the control information generating section 120 and the like by reading a program from the information storage medium that stored a program for making the computer function as the control information generating section 120 and the like.

As such information storage medium 190, for example, CD-ROM, DVD-ROM, ROM, RAM, HDD and the like may be applicable, and the reading method of its program may be either a contact type or a non-contact type.

Further, instead of the information storage medium 190, it is possible to perform each function mentioned above on the computer by downloading programs and the like to realize each of the above-mentioned functions from host equipment and the like through a transmission line.

Description of the Processing Flow

Next, a flow of processing using each of these sections will be described.

Figure 6:
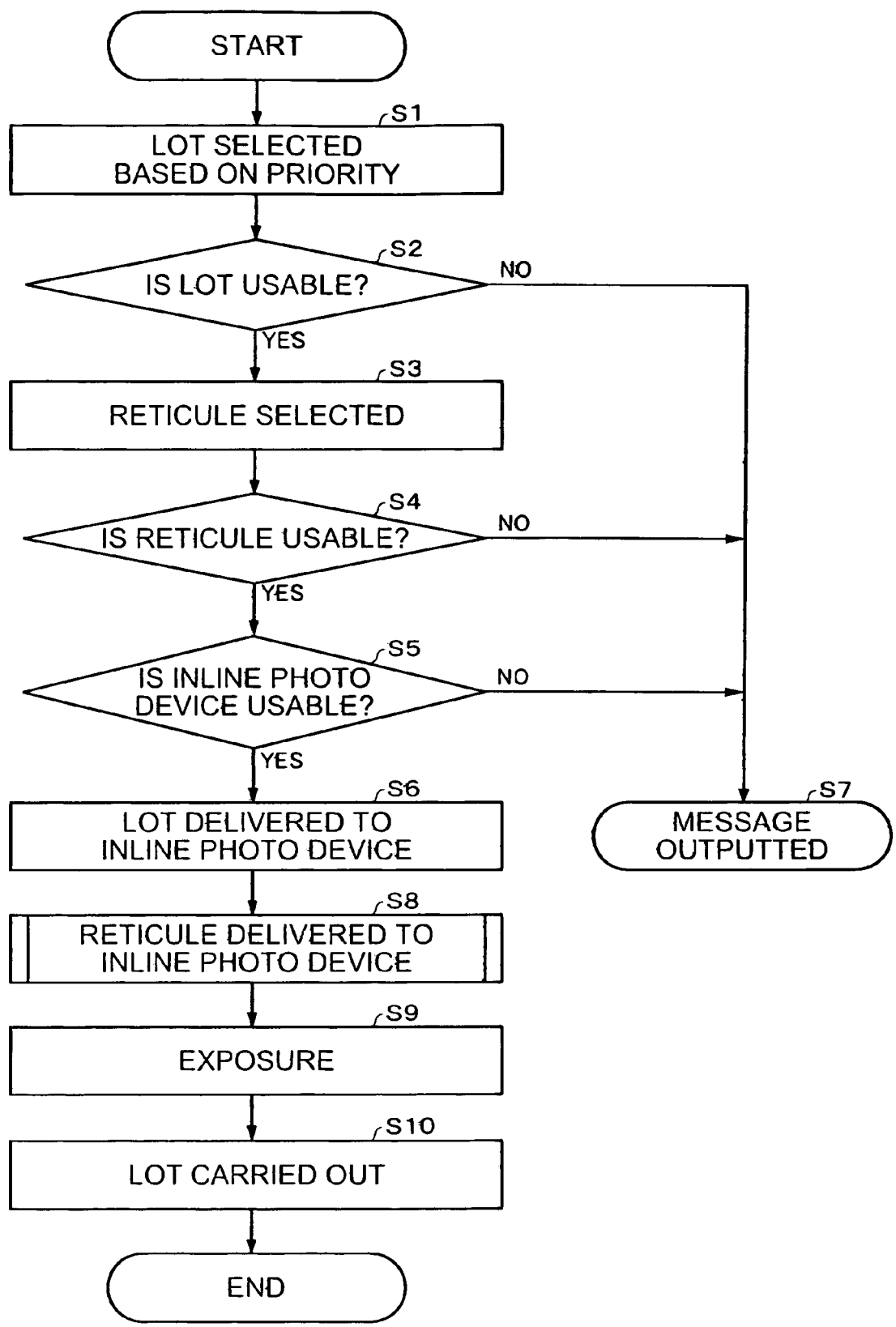
FIG. 6 is a flowchart showing a flow of exposure processing according to an example of the present embodiment.

FIG. 6 is a flowchart showing a flow of exposure processing according to an example of the present embodiment.

First, the control information generating section 120 refers to the lot control data 142 and selects a lot having the highest "priority." (the least value of priority in the present example) (Step S1) Further, by referring to the "Status" of the lot of the lot control data, the control information generating section 120 determines whether or not it is usable (Step S2).

If the lot subject to processing is not usable, the control information generating section 120 generates message image information showing that the lot subject to processing is not usable, and a PC's display connected to the supply control apparatus 100 outputs the message based on the message image information (Step S7).

If the lot subject to processing is usable, the control information generating section 120 refers to the "Reticule in Use ID" of the lot control data 142 and selects a reticule having the reticule ID from the reticule control data 144 (Step S3).

Further, by referring to the "Status" of the reticule control data 144, the control information generating section 120 determines whether or not it is usable (Step S4).

If the reticule subject to use is not usable, the PC's display outputs a message that the reticule subject to use is not usable (Step S7).

Further, if the reticule subject to use is usable, by referring to the "Status" of the inline photo device control data 146, the control information generating section 120 determines whether or not the inline photo device 400 is usable (Step S5).

If the inline photo device 400 is not usable, the PC's display outputs a message that the inline photo device 400 subject to use is not usable (Step S7).

If the lot, the reticule, and the inline photo device 400 are all usable, the supply control apparatus 100 generates control information (lot supply control information) for supplying the lot subject to use to the inline photo device 400, while the communications section 110 transmits the control information to the lot supply device 200. It should be noted that this control information includes, for example, the Lot ID, the Device ID and the like.

The lot supply device 200, based on the control information, delivers the lot selected at Step 1 to the inline photo device 400 (Step S6). It should be noted that, for delivery of the lot and the reticule, an automatic traveling cart and the like may be used.

Further, the reticule stocker 300 delivers the reticule selected to be subject to use to the inline photo device 400 (Step S8).

At this point, delivery processing of a reticule will be described in detail.

Figure 7:
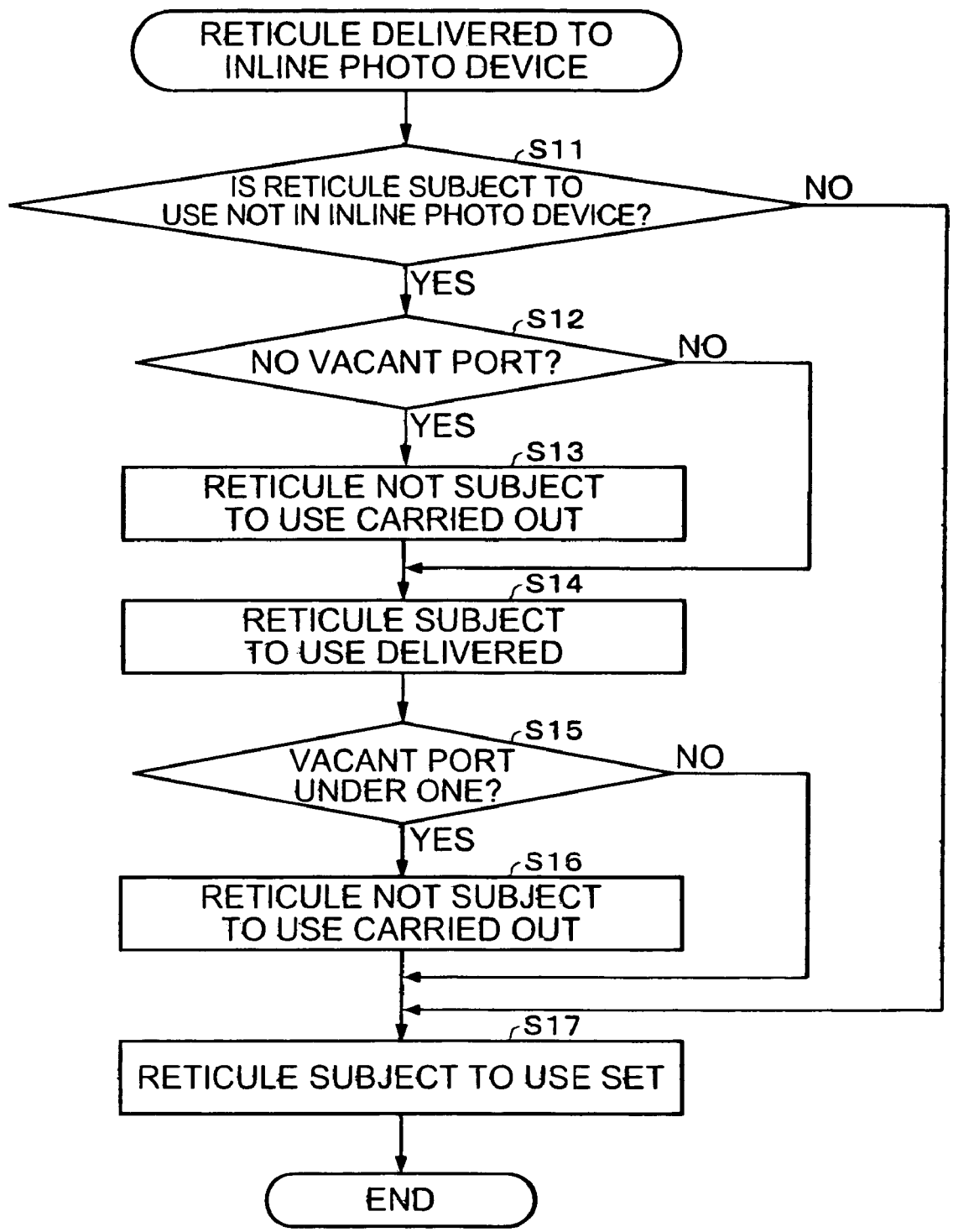
FIG. 7 is a flowchart showing a flow of reticule delivery processing according to an example of the present embodiment.

FIG. 7 is a flowchart showing a flow of reticule delivery processing according to an example of the present embodiment.

In the present example, the supply control apparatus 100 controls the delivery of a reticule to and from the inline photo device 400 so that there is as many as at least one vacant port in the inline photo device 400.

The control information generating section 120 refers to the "Reticule in Use ID" and determines whether or not the reticule subject to use is in a port of the inline photo device 400 (Step S11).

If the reticule subject to use is in a port of the inline photo device 400, the control information generating section 120 generates control information (mask move control information) for setting the reticule in the port, and the communications section 110 transmits the control information to the inline photo device 400. It should be noted that this control information includes, for instance, the Port ID, the Reticule in Use ID and the like.

The inline photo device 400, based on the control information received from the supply control apparatus 100, sets the reticule subject to use for exposure (Step S17).

Further, if the reticule subject to use is not in a port of the inline photo device 400, the control information generating section 120 refers to the "Port ID" and the "Reticule in Use ID" and determines whether or not there is no vacant port (Step S12).

If there is a vacant port in the inline photo device 400, the control information generating section 120 generates control information (mask supply control information) for supplying the reticule subject to use to the inline photo device 400, and the communications section 110 transmits the control information to the reticule stocker 300. It should be noted that this control information includes, for instance, the Reticule in Use ID, the Device ID and the like.

The reticule stocker 300, based on the control information, delivers the reticule subject to use to the inline photo device 400 for use (Step S14).

Further, if there is a vacant port in the inline photo device 400, the control information generating section 120, for example, generates control information (mask move control information) for delivering the reticule not in use for the longest period of time as the reticule not subject to use to the reticule stocker 300, and the communications section 110 transmits the control information to the inline photo device 400. It should be noted that this control information includes, for instance, the Port ID, the Reticule in Use ID and the like. Further, as a criterion for setting as a reticule not subject to use, the reticule usage frequency, and for other than time in use, for example, a criterion of not being in use for the longest period of time, a criterion of imminent inspection time and the like may be employed.

The inline photo device 400, based on control information received from the supply control apparatus 100, carries out a reticule not subject to use (Step S13). It should be noted that this operation vacates a port.

The inline photo device 400 delivers a reticule subject to use to a vacated port (Step S14).

It should be noted that the update section 130 updates the "Lot in Use ID," the "Reticule in Use ID" and the like of the inline photo device control data 146 according to the carrying out and delivery of a lot and a reticule.

After the reticule subject to use is delivered (Step S15), the control information generating section 120 refers to the "Port ID" and the "Reticule in Use ID" and determines whether or not there is less than one vacant lot (Step S15).

In the case of less than one vacant port, by means of the same processing as Step S13, the inline photo device 400 carries out a reticule not subject to use (Step S16). This processing enables the inline photo device 400 to operate at all times in a condition of more than one vacant port.

After the reticule not subject to use is carried out (Step S16), or in the case of less than one vacant port (in case of more than two), the online photo device 400, based on control information received from the supply control apparatus 100, sets a reticule subject to use for exposure (Step S17).

By means of the forgoing procedures, the reticule subject to use is set for exposure.

The inline photo device 400 performs exposure processing and the like (Step S9) to the lot, which has been coated with photoresist and the like inside the inline photo device 400, by using the reticule subject to use.

The inline photo device 400 carries out the lot upon completion of development processing after exposure processing. The automatic traveling cart delivers the lot to a device to be used in the next process.

As described above, according to the present embodiment, the supply control apparatus 100 performs integrated control of the status and the like of a lot, a reticule, and the inline photo device 400 and can properly control the supply of a lot and a mask to the inline photo device 400 without going through the operator, additionally being capable of control such that even if there are a plurality of photo devices such as the inline photo devices 400-1 and 400-2, a lot and a reticule may be supplied to a proper photo device.

Further, the supply control apparatus 100 can efficiently perform the carrying out and delivery of a reticule by ensuring that more than one vacancy may be produced at the delivery section of the inline photo device 400.

Still further, according to the present embodiment, since the supply control apparatus 100 can carry a reticule not subject to use out of the inline photo device 400 after first delivering the reticule subject to use to the inline photo device 400, efficient exposure processing may be performed by the inline photo device 400.

Furthermore, the control supply device can more efficiently deliver and the like by controlling the carrying out and delivery of a lot and a reticule to the inline photo device 400 in terms of priority. Generally, exposure is not performed immediately after a lot is delivered to the inline photo device 400, but only after photoresist coating and baking of the lot is performed, exposure using the reticule to a lot is performed.

Consequently, the supply control apparatus 100 can determine whether or not a reticule inspection is needed by controlling the usage frequency and the usage time of a reticule. If the inspection is needed, it is possible to let the inline photo device 400 to automatically perform the reticule inspection. Also, when the inspection is needed, the supply control apparatus 100 can change the "Status" of the reticule to "Not Usable," and can let exposure processing to be performed by using only those reticules which are "Usable."

Further, if there is no proper mask in a lot, the supply control apparatus 100 can control the lot supply device and the reticule stocker 300 so that another lot and another mask may be selected and used.

VARIATION EXAMPLE

In the foregoing, the preferred embodiment to which the present invention is applied has been described. However, the application of the present invention is not confined to the above-mentioned example.

For instance, in the above-mentioned example, the lot supply device 200 was employed for a lot supply device and the reticule stocker 300 was employed for a mask supply device. However, when delivering reticules as a lot with a plurality of delivery carts, the delivery carts may be used as the lot supply device and the mask supply device.

Further, for instance, in the above-mentioned example, the supply control apparatus 100 was used for a supply control system, but the function of the supply control apparatus 100 may be dispersed to a plurality of devices.

What is claimed is:

1. A supply control system controlling supply of a lot and a mask to a photo device, comprising:

a memory for storing lot control data to control a plurality of lots and mask control data to control a plurality of masks;

an update section that updates the lot control data and the mask control data;

a control information generating section that generates lot supply control information to control supply of a lot and mask supply control information to control supply of a mask based on the lot control data and the mask control data;

a communications section for transmitting the lot supply control information to a lot supply device that supplies a lot to the photo device and transmitting the mask supply control information to a mask supply device that supplies a mask to the photo device, and receiving notification information showing a current position of a lot or a mask from the lot supply device, the mask supply device, or the photo device;

wherein:

the lot control data includes data showing lot identification information, current lot position data showing a current position of a lot, data showing mask identification information to be used in a lot, and priority data showing data regarding a priority of processing a lot;

the mask control data includes data showing the mask identification information and current mask position data showing a current position of a mask, the mask control data being made relatable to the lot control data by the mask identification information;

the update section updates the current lot position data and the current mask position data based on the notification information;

the control information generating section generates the lot supply control information and the mask supply control information based on the current lot position data and the current mask position data so as to process a lot in order of priority based on the priority data;

the photo device includes a mask loading unit capable of loading a plurality of masks, a move control unit for moving a mask inside the photo device, and an exposure side communications unit to generate the notification information for transmission to the communications section, the memory stores photo device control data to control the photo device;

the update section updates the photo device control date, based on the notification information;

the control information generating section generates mask move control information to control mask movement inside the photo device, based on the photo device control data;

the communications section transmits the mask move control information to the photo device;

the exposure side communications unit receives the mask move control information;

the move control unit loads a mask on the mask loading unit or moves a mask from the mask loading unit, based on the mask move control information;

the photo device control data includes port ID data showing a port by which to load a mask on the mask loading unit as well as mask ID data showing a mask set up on the port; and the control information generating section generates the mask move control information if it is determined that there is one port where no mask is loaded on the mask loading unit so that after one mask is moved from the mask loading unit, the mask subject to use may be loaded on a port of the mask loading unit.

2. A supply control method for controlling the supply of a lot and a mask to a photo device, comprising:

receiving notification information on a current position of a lot or a mask from the lot supply device, the mask supply device, or the photo device;

updating the current position data showing the current position of a lot or the current mask position data showing a mask based on the notification information;

upon request of exposure processing in the photo device, generating lot supply control information to control supply of a lot and mask control supply information to control supply of a mask based on lot control data and mask control data to control a plurality of masks, wherein:

the data showing the lot identification information, the current lot position data, and the data showing mask identification data to be used in a lot are included;

the lot control data to control a plurality of lots, data showing the mask identification information, and the current mask position data are included, and made relatable to the lot control data by the mask identification information;

transmitting the lot supply control information to the lot supply device that supplies a lot to the photo device; and transmitting the mask supply control information to the mask supply device that supplies a mask to the photo device;

wherein:

the lot control data includes priority data showing the priority of lot processing and a control information generating section generates the lot supply control information so as to process a lot in order of priority based on the priority data;

the photo device includes a mask loading unit capable of loading a plurality of masks, a move control unit for moving a mask inside the photo device, and an exposure side communications unit to generate the notification information for transmission thereof to the communications section, photo device control data to control the photo device is undated based on the notification information;

mask move control information to control mask movement inside the photo device is generated based on the photo device control data;

the mask move control information is transmitted to the photo device;

the exposure side communications unit receives the mask move control information;

the move control unit loads a mask on the mask loading unit or moves a mask from the mask loading unit, based on the mask move control information;

the photo device control data includes port ID data showing the port by which to load a mask on the mask loading unit as well as mask ID data showing a mask set up on the port; and if it is determined that there is one port where no mask is loaded on the mask loading unit, the control information generating section generates the mask move control information so that after one mask is moved from the mask loading unit, the mask subject to use may be loaded on a port of the mask loading unit.

* * * * *